US012408656B2

(12) United States Patent
Klaas (10) Patent No.: US 12,408,656 B2
(45) Date of Patent: Sep. 9, 2025

(54) SCENT DISPERSAL DEVICES (71) Applicant: Hunter Klaas, Stitzer, WI (US)

(72) Inventor: Hunter Klaas, Stitzer, WI (US)

(*) Notice: Subject to any disclaimer, the term of this patent is extended or adjusted under 35 U.S.C. 154(b) by 68 days.

(21) Appl. No.: 18/538,333

(22) Filed: Dec. 13, 2023

(65) Prior Publication Data
US 2025/0194584 A1 Jun. 19, 2025

(51) Int. Cl.
A01M 31/00 (2006.01)
A45F 5/02 (2006.01)

(52) U.S. Cl.
CPC ........... A01M 31/008 (2013.01); A45F 5/021 (2013.01)

(58) Field of Classification Search
CPC .............. A01M 31/008; A01M 1/2044; A01M 1/2055; A61L 9/127
See application file for complete search history.

(56) References Cited

U.S. PATENT DOCUMENTS

| 4,747,527 | A | | 5/1988 | Trumpower, II | |
| 4,788,787 | A | * | 12/1988 | Konietzki | A01M 31/008 242/405 |
| 5,074,439 | A | * | 12/1991 | Wilcox | A01M 31/008 224/222 |
| 5,148,949 | A | * | 9/1992 | Luca | A01K 27/007 239/327 |
| 5,622,314 | A | * | 4/1997 | Eason | A61L 9/12 239/47 |
| 5,906,298 | A | * | 5/1999 | Ward | A61L 9/127 239/36 |
| 5,947,379 | A | * | 9/1999 | Freeman | A01M 31/008 239/52 |
| 5,987,800 | A | * | 11/1999 | Regan | A01M 31/008 43/1 |
| 6,085,989 | A | * | 7/2000 | Cox | A61L 9/12 239/59 |
| 6,101,754 | A | * | 8/2000 | Knapick | A01M 31/008 43/1 |
| 6,209,252 | B1 | * | 4/2001 | McGough | A01M 31/008 43/1 |
| 6,270,485 | B1 | * | 8/2001 | Ekey | A61F 5/4408 224/663 |
| 6,390,348 | B1 | * | 5/2002 | Godshaw | B25H 3/00 224/660 |
| 6,470,619 | B1 | * | 10/2002 | Snyder | A01M 31/008 239/48 |
| 6,531,145 | B1 | | 3/2003 | Reichert | |
| 6,676,033 | B1 | * | 1/2004 | Campesi, Sr. | A61L 9/04 239/47 |

(Continued)

Primary Examiner — Magdalena Topolski (57) ABSTRACT

A scent dispersal devices for luring hunting game animals to a hunting area includes a belt that can be positioned around a waist of a user. A pouch is coupled to the belt. A scent container is positionable within the interior space for holding a scent fluid that attracts a game animal. A drag wick has a wick handle extending upwardly from a rod. The rod is positionable in the scent container and retains some of the scent fluid after being positioned in the scent container. A housing is coupled to the belt. A cord coupled to the housing is extendable and retractable relative to the housing. A cord clip coupled to the cord releasably engages the wick handle so that the drag wick can be dragged along a ground surface when the user walks along the ground surface while the cord is extended from the housing.

20 Claims, 9 Drawing Sheets (56) References Cited

U.S. PATENT DOCUMENTS

| | | | | |
|---|---|---|---|---|
| 6,712,286 B2* | 3/2004 | Baxter | A61L 9/042 | 239/46 |
| 7,073,732 B2* | 7/2006 | Abbas | A01M 31/008 | 239/34 |
| 7,093,770 B1* | 8/2006 | Moran | A61L 9/127 | 239/326 |
| 7,165,706 B2* | 1/2007 | Barr | A45F 5/021 | 224/672 |
| 7,419,102 B2* | 9/2008 | Harris, Jr. | A01M 29/12 | 239/6 |
| 7,597,494 B2* | 10/2009 | Migyanka | A45D 34/04 | 401/9 |
| 7,643,735 B1* | 1/2010 | Mast | A01M 1/2077 | 239/145 |
| 7,837,076 B2* | 11/2010 | Welker | A01M 31/00 | 239/152 |
| 7,988,984 B2* | 8/2011 | Hockaday | A01M 1/08 | 43/132.1 |
| 8,011,545 B2* | 9/2011 | Murdoch | B25H 3/00 | 224/675 |
| 8,157,140 B2* | 4/2012 | Jay | A45F 5/02 | 224/269 |
| 8,905,667 B1* | 12/2014 | Burks | A01M 31/00 | 224/148.1 |
| 9,089,124 B1* | 7/2015 | Cox | A01M 31/06 | |
| 9,179,730 B2* | 11/2015 | Waters | A43B 3/0031 | |
| 9,185,901 B1* | 11/2015 | Arcia | A01M 31/008 | |
| 9,717,231 B1* | 8/2017 | D'Arco | A01M 31/008 | |
| 9,980,478 B2* | 5/2018 | Roebuck | A01M 31/008 | |
| 10,912,855 B2* | 2/2021 | Webster | A61L 9/12 | |
| 10,959,422 B2* | 3/2021 | Dion | A01M 31/008 | |
| 11,241,007 B2* | 2/2022 | Burgeson | B65D 23/08 | |
| 11,419,327 B2* | 8/2022 | Charles | A01M 31/008 | |
| 2006/0289668 A1* | 12/2006 | Szymczak | A01M 31/008 | 239/152 |
| 2008/0054021 A1* | 3/2008 | Brown | A45F 5/02 | 222/175 |
| 2008/0190008 A1* | 8/2008 | Aslin | A01M 31/008 | 43/1 |

* cited by examiner

SCENT DISPERSAL DEVICES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scent dispersal devices and systems and more particularly pertains to a new scent dispersal devices and systems for luring hunting game animals to a hunting area.

(2) Description of Related Art Including Information Disclosed Under 37 CFR 1.97 and 1.98

The prior art relates to scent dispersal devices and systems. Scent dispersal systems are used in hunting to attract deer and other game animals to a particular location. Some animals, such as deer, use scents to determine the distance of a hunter or otherwise decide if an area is safe. For example, a hunter or other use may disperse a scent around a particular field or hunting blind where the hunter can wait for the animal. Some hunters will disperse a doe urine scent to lure bucks to the hunting area, because bucks are attracted to the doe urine. Similarly, buck urine may be used to attract doe to the hunting area. However, dispersing the various animal scents can require numerous pieces of equipment, which can be cumbersome and difficult for the hunter to carry around the hunting area. Thus, there is a need in the art for a convenient system for dispersing an animal scent and storing the equipment while the hunter is waiting for the game animal to reach the hunting area.

BRIEF SUMMARY OF THE INVENTION

An embodiment of the disclosure meets the needs presented above by generally comprising a belt having a first end and a second end. The first end is engageable to the second end so the belt can be positioned around a waist of a user. A pouch is coupled to the belt. A scent container is positionable within the interior space for holding a scent fluid that attracts a game animal. A drag wick has a wick handle and a rod. The wick handle extends upwardly from the rod. The rod is positionable in the scent container. The rod comprises a cloth material that retains at least some of the scent fluid after the rod is positioned in the scent container. A drag wick container is positionable within the interior space. The drag wick is positionable within the drag wick container. A housing is coupled to the belt. A cord is coupled to the housing. The cord is extendable and retractable relative to the housing. A cord clip is coupled to the cord. The cord clip releasably engages the wick handle of the drag wick so that the drag wick can be dragged along a ground surface when the user walks along the ground surface while the cord is extended from the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 11 thereof, a new scent dispersal devices and systems embodying the principles and concepts of an embodiment of the disclosure and generally designated by the reference numeral 10 will be described.

As best illustrated in FIGS. 1 through 11, the scent dispersal devices 10 generally comprise a belt 12 having a first end 14 and a second end 16. The belt 12 is generally formable into a loop. The first end 14 is engageable to the second end 16 wherein the belt 12 is configured for being positioned around a waist 18 of a user 20. The belt 12 may have an adjustable length.

A fastener 22 may be coupled to the first end 14 and the second end 16. The fastener 22 releasably engages the first end 14 to the second end 16 thereby forming the loop.

A pouch 24 may be coupled to the belt 12, for example being positioned proximate to the first end 14. The pouch 24 includes a bottom wall 26 and a peripheral wall 28 that is coupled to and extends upwardly from the bottom wall 26 to define an interior space 30. The peripheral wall 28 has an upper edge 32 to define an opening 34 into the interior space 30.

A lid 36 may be pivotably coupled to the upper edge 32 to selectively close the opening 34. An attachment 38 may releasably couple the lid 36 to the upper edge 32. For example, the attachment 38 may comprise a zipper or a hook and loop fastener.

A scent container 40 is generally positionable within the interior space 30. The scent container 40 is configured to hold a scent fluid 42. The scent fluid 42 is configured to attract a game animal 44. For example, the scent fluid 42 may comprise buck urine or doe urine when the user 20 is hunting deer.

A drag wick 46 includes a wick handle 48 and a rod 50. The wick handle 48 extends upwardly from the rod 50. The rod 50 is positionable in the scent container 40 and may comprising an absorbent material, such as cloth, whereby the rod 50 is configured to retain at least some of the scent fluid 42 after the rod 50 is positioned in the scent container 40. The drag wick 46 may further include a weight 52 that is coupled to the rod 50 distal to the wick handle 48.

A drag wick container 54 may be positionable within the interior space 30 of the pouch 42. The drag wick 46 is positionable within the drag wick container 54, for example for storage of the drag wick 46 when the drag wick 46 is not being used. The drag wick container 54 may comprise a tube shape for enclosing the rod 50.

A spray bottle 56 may be positionable within the interior space 30. The spray bottle 56 is generally configured to hold the scent fluid 42. The spray bottle 56 may include a nozzle 58 that is configured to diffuse the scent fluid 42 outwardly from the spray bottle 56.

Some embodiments may include a first spray bottle for holding and diffusing a first scent fluid and a second spray bottle for holding and diffusing a second scent fluid. For example, the first scent fluid may comprise a doe urine while the second scent fluid may comprise a buck urine. The particular embodiments of the scent fluid may be determined based on the type of game animal the user is trying to lure or attract with the scent dispersal devices 10.

A plurality of pockets 60 may be coupled to the peripheral wall 28 and arranged within the interior space 30. Each of the plurality of pockets 60 is generally configured to receive a one of the scent container 40, the drag wick container 54, and the spray bottle 56. For example, the plurality of pockets 60 may be aligned along a back side 62 of the peripheral wall 28.

A strap 64 having a first side 66 and a second side 68 may be positionable within the interior space 30. A connector 70 may releasably couple the first side 66 to the second side 68 whereby the strap 64 is releasably retained in a folded configuration. The strap 64 is configured to fit around a tree branch 72 when the strap 64 is retained in the folded configuration. In some embodiments, the connector 70 may comprise a hook and loop coupler, a button, a zipper, or a snap.

Figure 10:
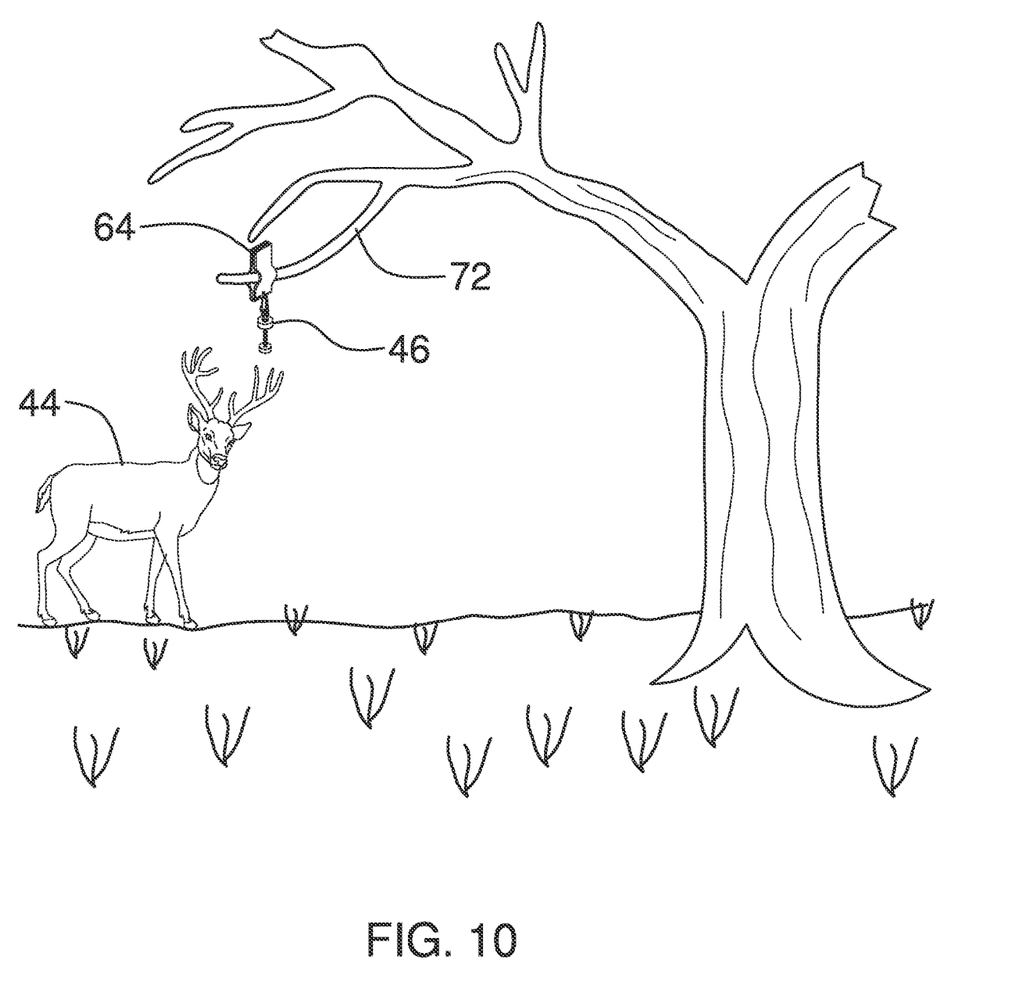
FIG. 10 is an in-use view of an embodiment of the disclosure.
Figure 11:
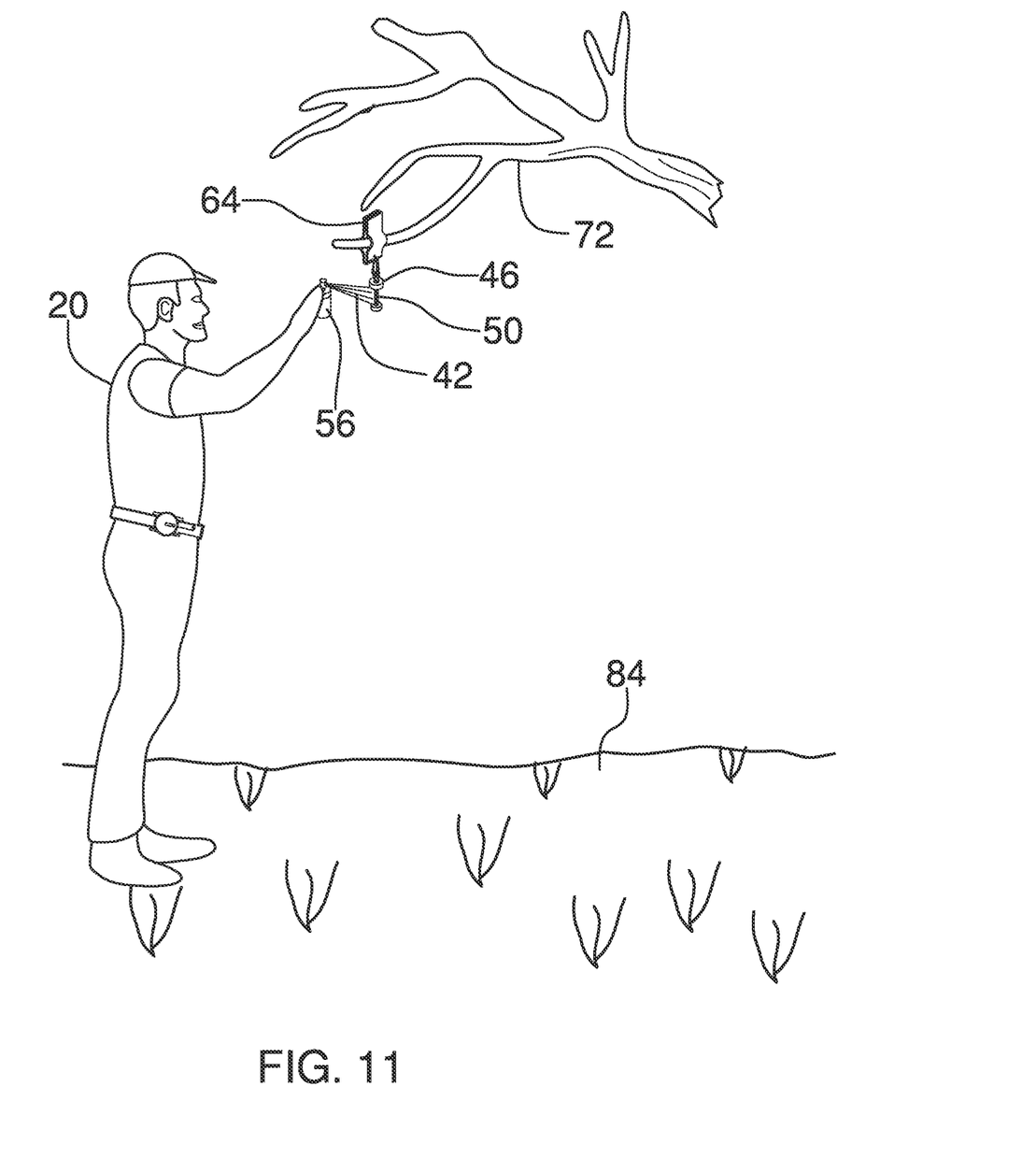
FIG. 11 is an in-use view of an embodiment of the disclosure.

A strap clip 74 may be coupled to the strap 64. The strap clip 74 is generally configured to releasably receive the wick handle 48 of the drag wick 46 whereby the drag wick 46 can be hung from the tree branch 72 when the strap 64 is fitted around the tree branch 72 in the folded configuration. For example, as shown in FIGS. 10 and 11, the drag wick 46 can be hung from the tree branch 72 to attract the game animal 44 to that tree branch 72. The user 20 can refresh the scent of the drag wick 46 by spraying the scent fluid 42 from the spray bottle 56 onto the rod 50 while the drag wick 46 hangs from the strap 64.

A housing 76 may be coupled to the belt 12. In some embodiments, the housing 76 may be positioned proximate to the second end 16. The housing 76 may comprise a circular shape. A cord 78 may be coupled to the housing 76. The cord 78 is generally extendable and retractable relative to the housing 76.

Figure 1:
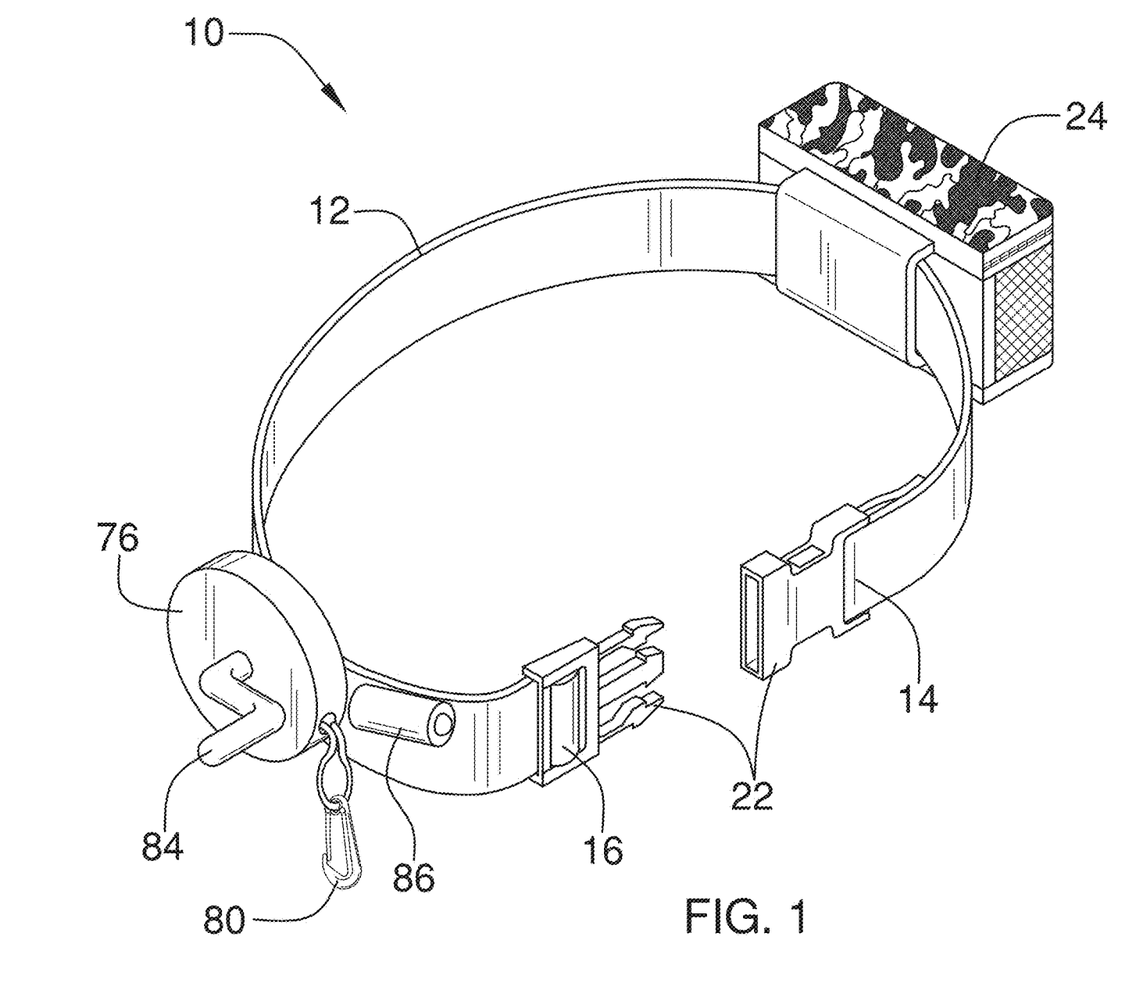
FIG. 1 is a front isometric view of a scent dispersal devices according to an embodiment of the disclosure.
Figure 2:
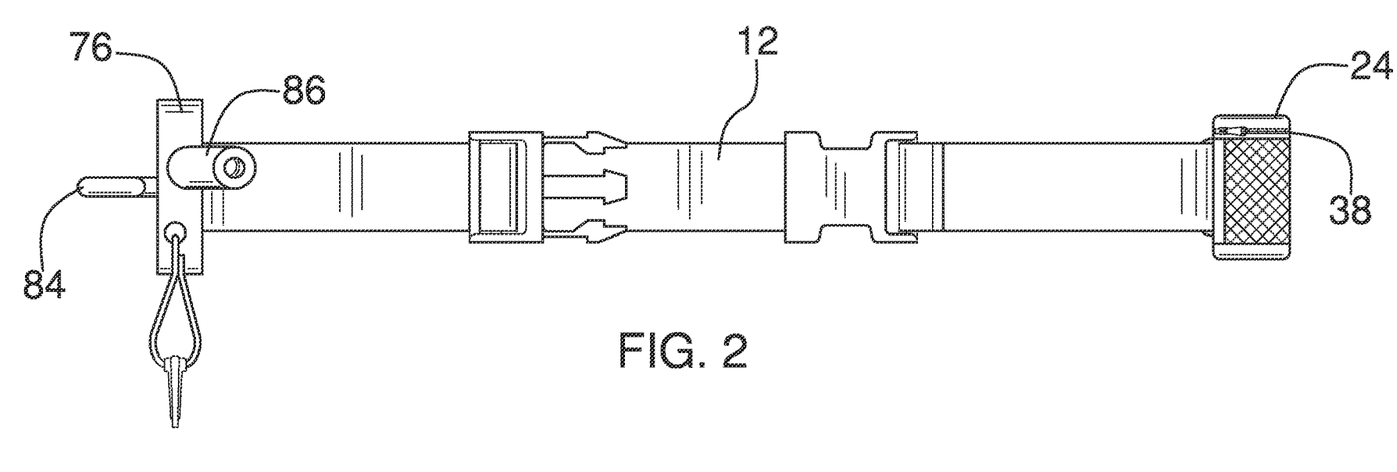
FIG. 2 is a front view of an embodiment of the disclosure.
Figure 3:
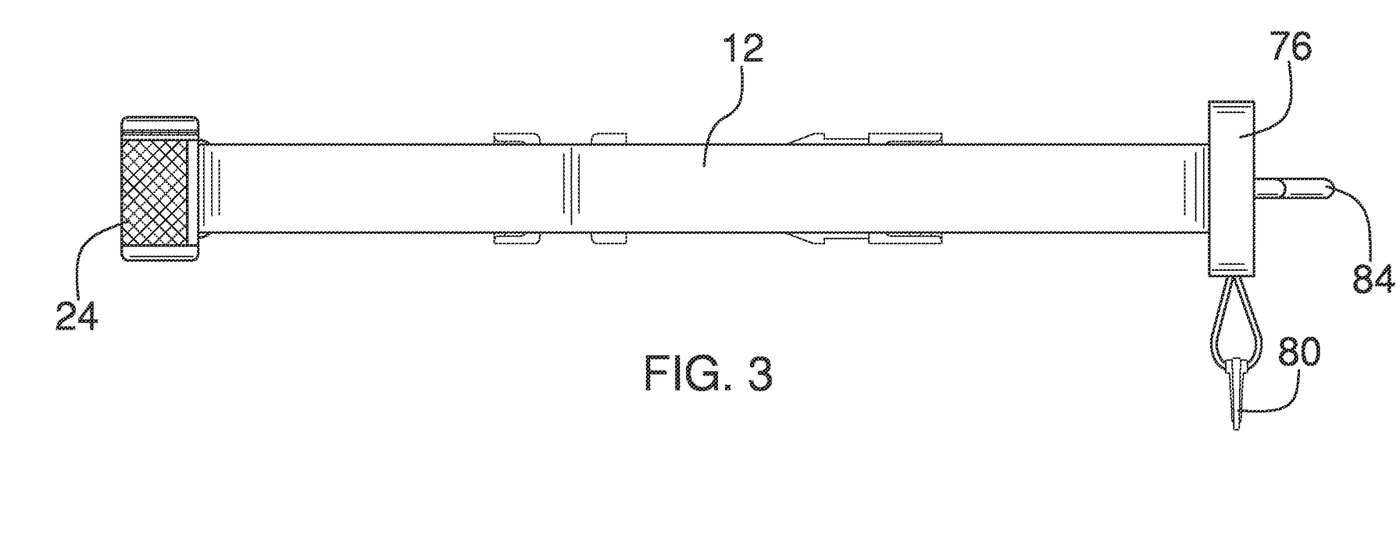
FIG. 3 is a rear view of an embodiment of the disclosure.
Figure 4:
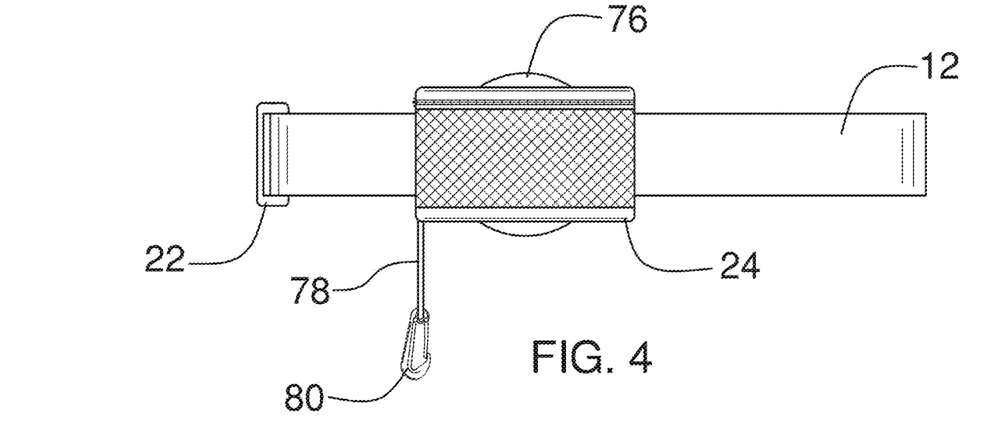
FIG. 4 is a side view of an embodiment of the disclosure.
Figure 5:
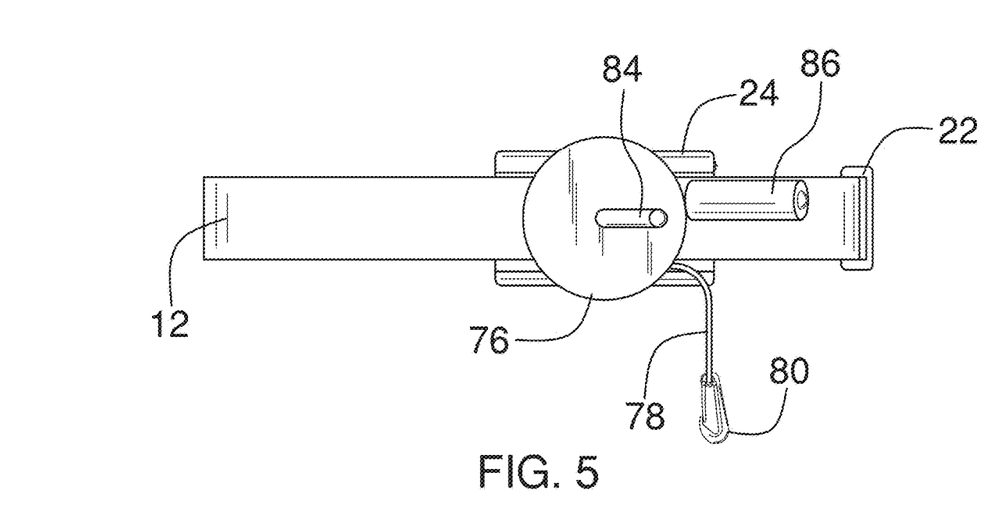
FIG. 5 is a side view of an embodiment of the disclosure.
Figure 6:
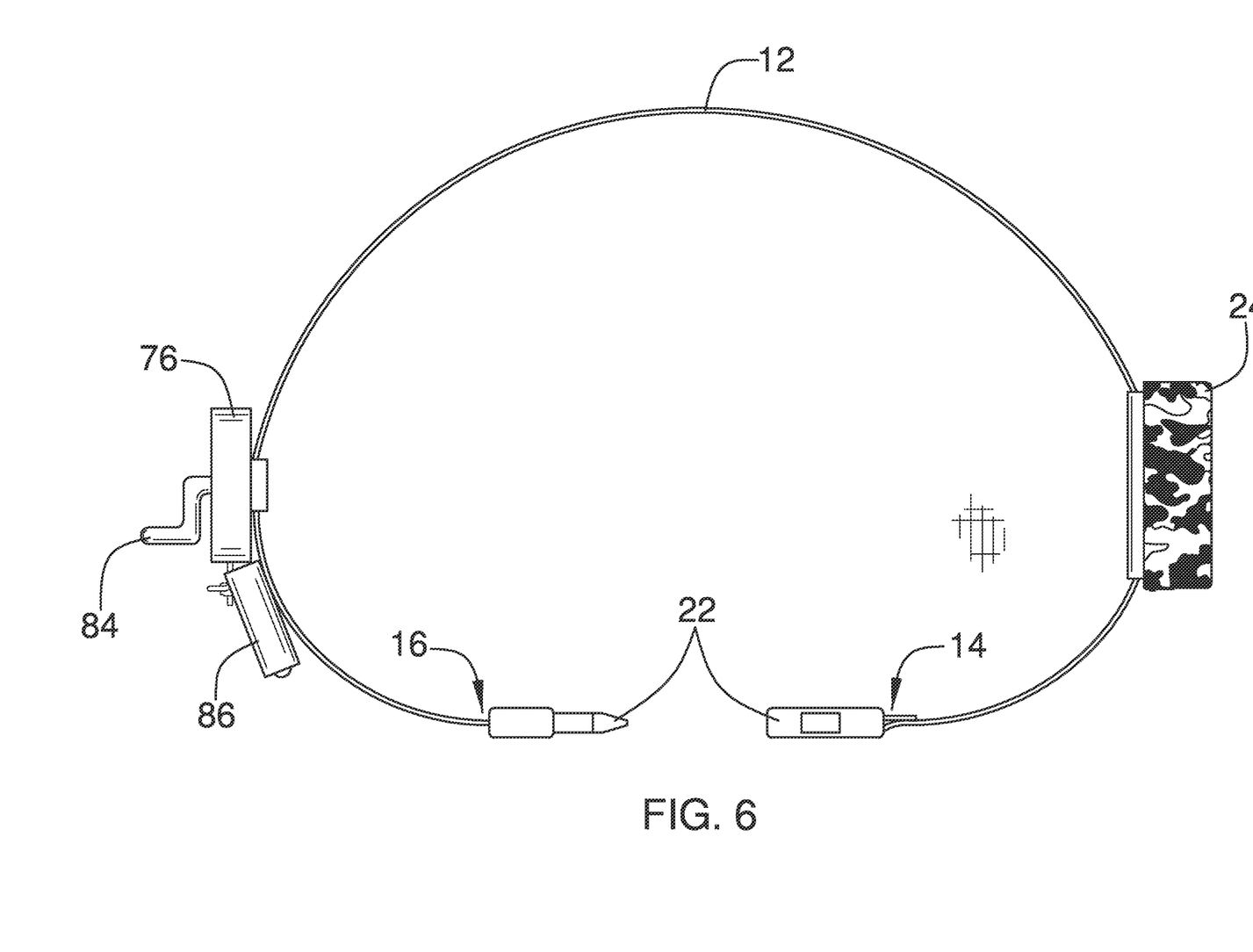
FIG. 6 is a top view of an embodiment of the disclosure.
Figure 7:
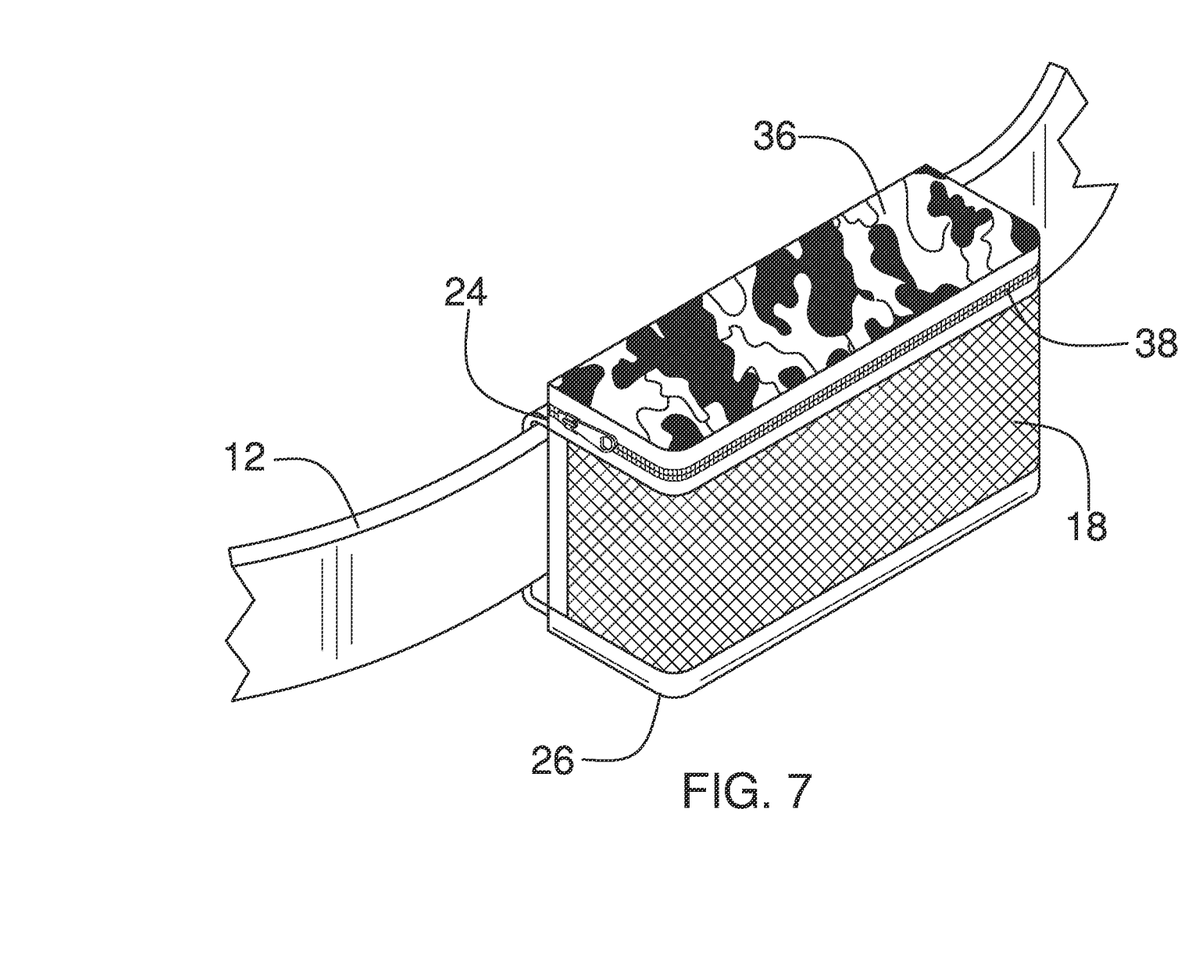
FIG. 7 is a detailed isometric view of an embodiment of the disclosure.
Figure 8:
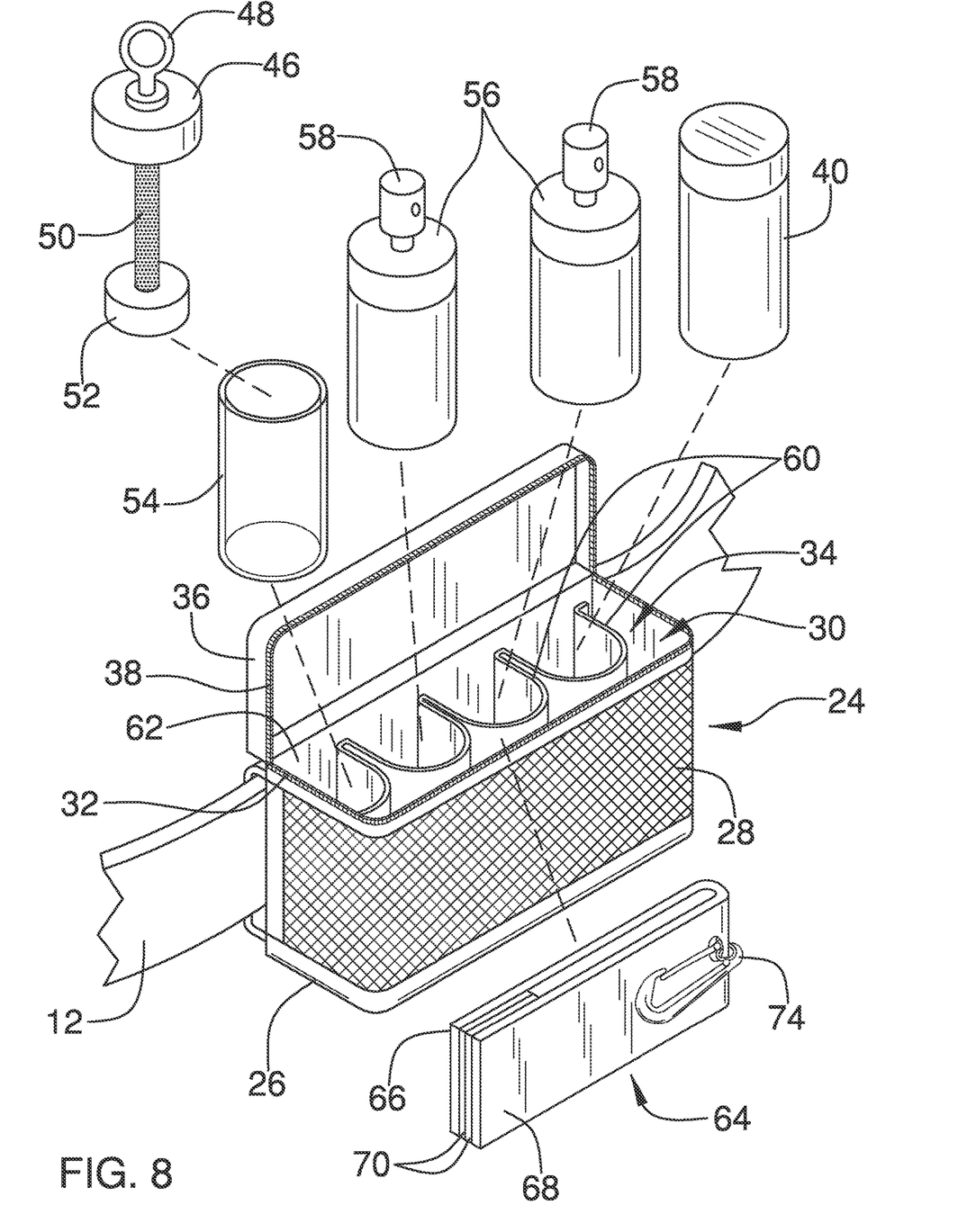
FIG. 8 is an exploded view of an embodiment of the disclosure.
Figure 9:
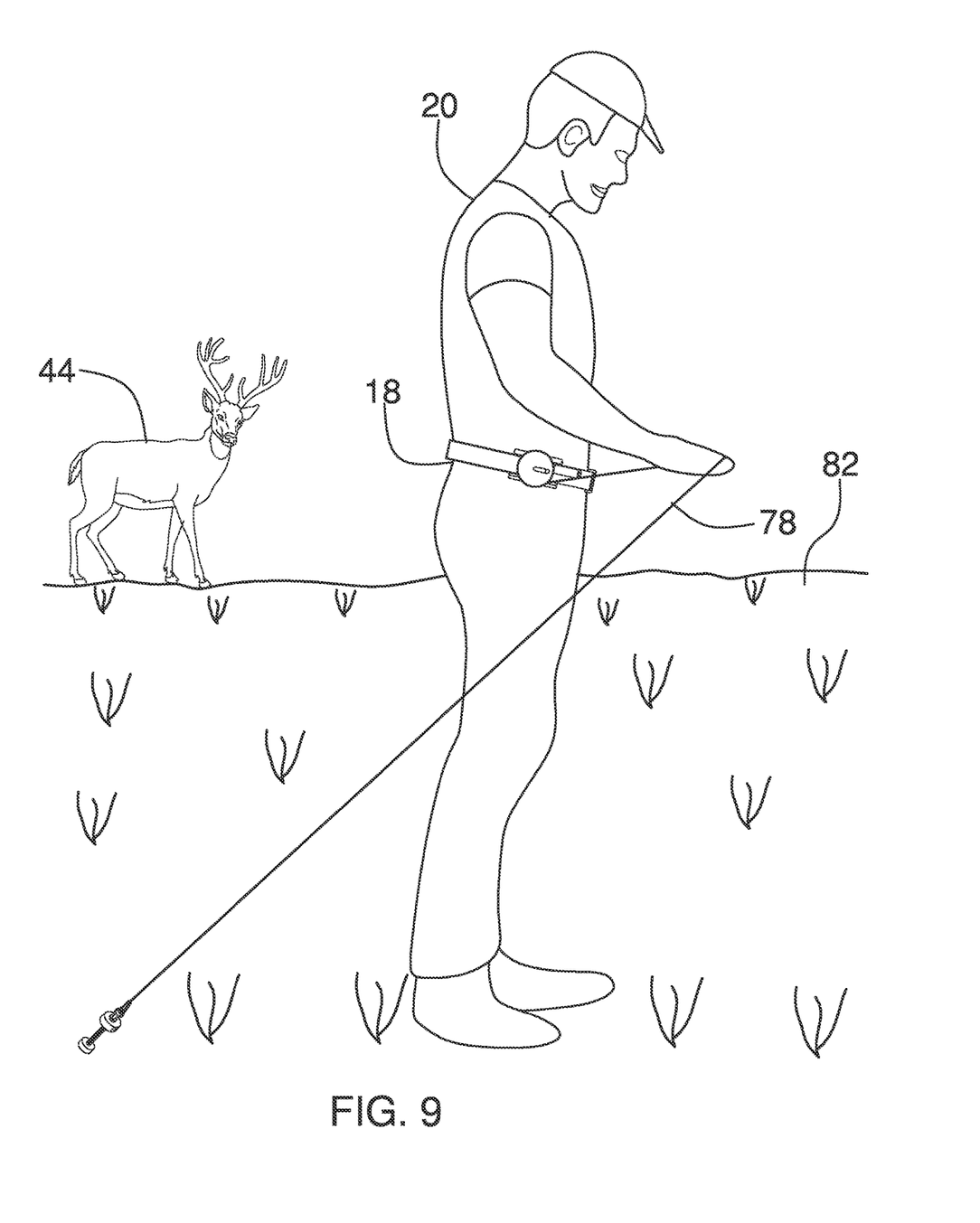
FIG. 9 is an in-use view of an embodiment of the disclosure.

A cord clip 80 may be coupled to the cord 78. The cord clip 80 can releasably engage the wick handle 48 of the drag wick 46 whereby the drag wick 46 is configured for being dragged along a ground surface 82 when the user 20 walks along the ground surface 82 while the cord 78 is extended from the housing 76. FIG. 9 provides an example of such embodiments.

A housing handle 84 may be rotatably coupled to the housing 76, wherein rotation of the housing handle 84 selectively extends and retracts the cord 78 relative to the housing 76.

A light 86 may be coupled to the belt 12. For example, the light 86 may be positioned adjacent to the housing 76. The light 86 is generally configured to be directed forwardly from the belt 12 when the belt 12 is positioned around the waist 18 of the user 20 whereby the light 86 is configured to illuminate the ground surface 82. In some embodiments, the light 86 may be pivotably coupled to the belt 12 whereby the light 86 is configured to be selectively directable to illuminate an area surrounding the user 20.

In use, the user 20 can store various scent fluids 42 within the pouch 24 coupled to the belt 12. The user 20 can disperse the scent fluid 42 using the drag wick 46 or the spray bottle 56. For example, the user 20 can create a trail of the scent fluid 42 along the ground surface 82 for the game animal 44 to follow. The user 20 can also position the drag wick 46 in a tree, or on the tree branch 72, using the strap 64. The user 20 can easily carry and organize the scent dispersal devices 10 using the belt 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A scent dispersal system for use in hunting, the scent dispersal system comprising:
    a belt having a first end and a second end, the first end being engageable to the second end wherein the belt is configured for being positioned around a waist of a user;
    a pouch being coupled to the belt the pouch comprising an interior space;
    a scent container being positionable within the interior space, the scent container being configured to hold a scent fluid, the scent fluid being configured to attract a game animal;
    a drag wick having a wick handle and a rod, the wick handle extending upwardly from the rod, the rod being positionable in the scent container, the rod being configured to retain at least some of the scent fluid after the rod is removed from the scent container;
    a drag wick container being positionable within the interior space, the drag wick being positionable within the drag wick container;
    a housing being coupled to the belt;
    a cord being coupled to the housing, the cord being extendable and retractable relative to the housing;
    a cord clip being coupled to the cord, wherein the cord clip releasably engages the wick handle of the drag wick whereby the drag wick is configured for being dragged along a ground surface when the user walks along the ground surface while the cord is extended from the housing.

2. The scent dispersal system of claim 1, wherein the belt has an adjustable length.

3. The scent dispersal system of claim 1, further comprising a fastener being coupled to the first end and the second end, the fastener releasably engaging the first end to the second end thereby forming a closed loop.

4. The scent dispersal system of claim 1, wherein the pouch is positioned proximate to the first end.

5. The scent dispersal system of claim 1, the pouch further comprising a bottom wall and a peripheral wall being coupled to and extending upwardly from the bottom wall to define the interior space, the peripheral wall having an upper edge to define an opening into the interior space.

6. The scent dispersal system of claim 5, further comprising:
    a lid being pivotably coupled to the upper edge to selectively close the opening; and
    an attachment releasably coupling the lid to the upper edge.

7. The scent dispersal system of claim 1, the drag wick further comprising a weight being coupled to the rod distal to the wick handle.

8. The scent dispersal system of claim 1, wherein the drag wick container has a tube shape.

9. The scent dispersal system of claim 1, further comprising a housing handle being rotatably coupled to the housing, wherein rotation of the housing handle selectively extends and retracts the cord relative to the housing.

10. The scent dispersal system of claim 1, further comprising a light being coupled to the belt, the light being configured to be directed forwardly from the belt when the belt is positioned around the waist of the user whereby the light is configured to illuminate the ground surface.

11. The scent dispersal system of claim 10, wherein the light is pivotably coupled to the belt whereby the light is configured to be selectively directable to illuminate an area surrounding the user.

12. The scent dispersal system of claim 10, wherein the light is positioned adjacent to the housing.

13. The scent dispersal system of claim 1, further comprising a spray bottle being positionable within the interior space, the spray bottle being configured to hold the scent fluid.

14. The scent dispersal system of claim 13, the spray bottle further comprising a nozzle being configured to diffuse the scent fluid outwardly from the spray bottle.

15. The scent dispersal system of claim 13, further comprising a plurality of pockets being coupled to the peripheral wall and being arranged within the interior space, each of the plurality of pockets being configured to receive a one of the scent container, the drag wick container, and the spray bottle.

16. The scent dispersal system of claim 1, further comprising a plurality of pockets being coupled to the peripheral wall and being arranged within the interior space, each of the plurality of pockets being configured to receive a one of the scent container and the drag wick container.

17. The scent dispersal system of claim 1, further comprising a strap being positionable within the interior space.

18. The scent dispersal system of claim 17, the strap further comprising a first side and a second side, the scent dispersal system further comprising a strap clip being coupled to the strap, the strap clip being configured to releasably receive the wick handle of the drag wick.

19. The scent dispersal system of claim 18, further comprising a connector releasably coupling the first side of the strap to the second side of the strap whereby the strap is releasably retained in a folded configuration, the strap being configured to fit around a tree branch when the strap is retained in the folded configuration, whereby the drag wick can be hung from the tree branch when the strap is fitted around the tree branch in the folded configuration.

20. A scent dispersal system for use in hunting, the scent dispersal system comprising:
    a belt having a first end and a second end, the belt being formable into a loop, the first end being engageable to the second end wherein the belt is configured for being positioned around a waist of a user, the belt having an adjustable length;
    a fastener being coupled to the first end and the second end, the fastener releasably engaging the first end to the second end thereby forming the loop;
    a pouch being coupled to the belt, the pouch being positioned proximate to the first end, the pouch having a bottom wall and a peripheral wall being coupled to and extending upwardly from the bottom wall to define an interior space, the peripheral wall having an upper edge to define an opening into the interior space;
    a lid being pivotably coupled to the upper edge to selectively close the opening;
    an attachment releasably coupling the lid to the upper edge, the attachment being a zipper;
    a scent container being positionable within the interior space, the scent container being configured to hold a scent fluid, the scent fluid being configured to attract a game animal;
    a drag wick having a wick handle and a rod, the wick handle extending upwardly from the rod, the rod being positionable in the scent container, the rod comprising a cloth material whereby the rod is configured to retain at least some of the scent fluid after the rod is removed from the scent container, the drag wick including:
  a weight being coupled to the rod distal to the wick handle;
a drag wick container being positionable within the interior space, the drag wick being positionable within the drag wick container, the drag wick container comprising a tube;
a spray bottle being positionable within the interior space, the spray bottle being configured to hold the scent fluid, the spray bottle including:
  a nozzle being configured to diffuse the scent fluid outwardly from the spray bottle;
a plurality of pockets being coupled to the peripheral wall and being arranged within the interior space, each of the plurality of pockets being configured to receive a one of the scent container, the drag wick container, and the spray bottle, the plurality of pockets being aligned along a back side of the peripheral wall;
a strap having a first side and a second side, the strap being positionable within the interior space;
a connector releasably coupling the first side to the second side whereby the strap is releasably retained in a folded configuration, the strap being configured to fit around a tree branch when the strap is retained in the folded configuration, the connector being a hook and loop coupler;
a strap clip being coupled to the strap, the strap clip being configured to releasably receive the wick handle of the drag wick whereby the drag wick can be hung from the tree branch when the strap is fitted around the tree branch in the folded configuration;
a housing being coupled to the belt, the housing being positioned proximate to the second end, the housing being circular;
a cord being coupled to the housing, the cord being extendable and retractable relative to the housing;
a cord clip being coupled to the cord, wherein the cord clip releasably engages the wick handle of the drag wick whereby the drag wick is configured for being dragged along a ground surface when the user walks along the ground surface while the cord is extended from the housing;
a housing handle being rotatably coupled to the housing, wherein rotation of the housing handle extends and retracts the cord relative to the housing; and
a light being coupled to the belt, the light being configured to be directed forwardly from the belt when the belt is positioned around the waist of the user whereby the light is configured to illuminate the ground surface, the light being pivotably coupled to the belt whereby the light is configured to be selectively directable to illuminate an area surrounding the user, the light being positioned adjacent to the housing.

\* \* \* \* \*